US012576627B2

(12) United States Patent
Prabhu et al.

(10) Patent No.:    US 12,576,627 B2
(45) Date of Patent:    Mar. 17, 2026

(54) METHOD FOR METAL BONDING

(71) Applicant: Textron Aviation Inc., Wichita, KS (US)

(72) Inventors: Nishad S. Prabhu, Wichita, KS (US); Joshua Ross Huston, Douglass, KS (US); Kishor E. Shelar, Wichita, KS (US); Amit Tamhane, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 226 days.

(21) Appl. No.: 18/493,009

(22) Filed: Oct. 24, 2023

(65) Prior Publication Data

US 2025/0128507 A1      Apr. 24, 2025

(51) Int. Cl.
| | |
|---|---|
| *B32B 37/10* | (2006.01) |
| *B32B 15/01* | (2006.01) |
| *B32B 37/06* | (2006.01) |
| *B32B 38/00* | (2006.01) |

(52) U.S. Cl.
CPC ............ *B32B 37/10* (2013.01); *B32B 15/016* (2013.01); *B32B 37/06* (2013.01); *B32B 38/0004* (2013.01); *B32B 38/0012* (2013.01); *B32B 2311/24* (2013.01); *B32B 2605/18* (2013.01)

(58) Field of Classification Search
CPC ........ H05K 2203/068; Y10T 156/1043; Y10T 156/1044; B32B 37/10; B32B 37/06; B32B 15/016; B32B 38/0004; B32B 38/0012; B32B 2311/24; B32B 2605/18; B32B 2037/262; B32B 38/162

USPC ......... 156/288, 221, 222, 281; 228/155, 158
See application file for complete search history.

(56)           References Cited

U.S. PATENT DOCUMENTS

| | | | | |
|---|---|---|---|---|
| 5,615,470 | A | * | 4/1997 | Ceraso ................ B29C 66/8322 |
| | | | | 156/216 |
| 5,755,916 | A | * | 5/1998 | Ceraso ................... H05K 3/022 |
| | | | | 156/583.1 |
| 10,155,281 | B2 | | 12/2018 | Verma |
| 10,293,589 | B2 | | 5/2019 | Larsen et al. |
| 10,758,936 | B2 | | 9/2020 | Braley et al. |
| 2008/0000577 | A1 | | 1/2008 | Vichniakov |
| 2013/0316148 | A1 | | 11/2013 | Gunnink |

FOREIGN PATENT DOCUMENTS

| | | | | |
|---|---|---|---|---|
| JP | | H03169095 A | * | 7/1991 |

* cited by examiner

*Primary Examiner* — John L Goff, II
(74) *Attorney, Agent, or Firm* — Avek IP, LLC

(57)           ABSTRACT

A method for metal bonding includes providing at least two metal sheet assemblies wherein each metal sheet assembly includes at least one frame member and a flat metal sheet. Each frame member is placed onto the flat metal sheet to form a metal sheet assembly. The metal sheet assemblies are stacked upon one another to form a sheet stack, and the sheet stack is autoclaved to allow for bonding to occur between the flat metal sheet and the frame member of each metal sheet assembly. The sheet stack is removed from the autoclave and each metal sheet assembly is unstacked from the sheet stack. Each bonded metal sheet assembly then undergoes a roll forming process to provide at a curved metal sheet assembly.

13 Claims, 5 Drawing Sheets

400

402 — PROVIDING AT LEAST TWO METAL SHEET ASSEMBLIES

404 — STACKING THE AT LEAST TWO METAL SHEET ASSEMBLIES

406 — PLACING THE SHEET STACK IN AN AUTOCLAVE

408 — REMOVING THE SHEET STACK FROM AUTOCLAVE

410 — UNSTACKING THE METAL SHEET ASSEMBLIES

412 — FORM ROLLING EACH METAL SHEET ASSEMBLY

METHOD FOR METAL BONDING

BACKGROUND OF THE INVENTION

1. Field

The disclosed embodiments relate generally to the field of aircraft manufacturing. More specifically, the disclosed embodiments relate to the process of airframe skin assembly utilizing metal.

2. Description of the Related Art

It is known for a diffusion bonding process to be used for forming a metal sheet stack. For example, U.S. Pat. No. 10,155,281 to Verma et al. describes a rolling process which may be applied to a metal sheet stack exposed to diffusion bonding processes. The rolling process describes rolling sheets of metal to decrease their thickness and expand their surface area.

It is also known to form metallic sheets used for aircraft. For example, U.S. Patent Application Publication No. 2008/0000577 to Vichniakov describes a process to bond together metallic sheets for aircraft using an adhesive bond. Vichniakov describes a coating applied to surfaces of materials being adhered together.

It is also known to form composite sheets for aircraft. For example, U.S. Pat. No. 10,758,936 to Braley et al. describes a process for forming parts from carbon nanomaterial structures. The process includes forming the composite sheet and using heat or pressure for the sheet to be rolled onto a spool.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, a method for metal bonding includes: providing at least two flat metal sheet assemblies, wherein each of the flat metal sheet assemblies includes a metal sheet and a plurality of frame members laid on top of the metal sheet; stacking the metal sheet assemblies to create a sheet stack; placing the sheet stack into an autoclave for bonding each metal sheet with its frame members; removing the sheet stack from the autoclave; unstacking the flat metal sheet assemblies from the metal sheet stack; and form rolling each of the flat metal sheet assemblies to provide at least two curved metal sheet assemblies, respectively.

In some embodiments, a method for bonding a metal sheet assembly includes: providing a first metal sheet and a first frame member; performing a bonding preparation to the first metal sheet and the first frame member; laying the first frame member flat on the first metal sheet; providing a second metal sheet and a second frame member; performing the bonding preparation to the second metal sheet and the second frame member; laying the second frame member flat on the second metal sheet; placing the second metal sheet and second frame member on top of the first metal sheet and first frame member to form a stack; placing the stack inside an autoclave; autoclaving the stack, thereby bonding the first frame member to the first metal sheet to form a first sheet assembly and bonding the second frame member to the second metal sheet to form a second sheet assembly, wherein the first sheet assembly and the second sheet assembly are each substantially flat; removing the stack from the autoclave; unstacking the first sheet assembly and the second sheet assembly; roll forming the first sheet assembly and roll forming the second sheet assembly.

In some embodiments, a method for bonding metal sheet assemblies includes: providing a plurality of metal sheets and a plurality of frame members; pre-fitting the metal sheets; hanging the metal sheets; cleaning the metal sheets; placing a first frame member on a first metal sheet and placing a second frame member on a second metal sheet; sealing the first metal sheet in a bag and sealing the second metal sheet in a bag; stacking the second metal sheet onto the first metal sheet to form a sheet stack; placing the sheet stack into an autoclave; autoclaving the sheet stack thereby forming and curing a first bond between the first metal sheet and the first frame member and forming and curing a second bond between the second metal sheet and the second frame member; removing the sheet stack from the autoclave; unsealing the first metal sheet and unsealing the second metal sheet; unstacking the second metal sheet from the first metal sheet; and roll forming each of the first metal sheet and the second metal sheet thereby forming a first curved metal sheet and a second curved metal sheet. bonding the first curved metal sheet to an additional frame member, and; bonding the second curved metal sheet to a second additional frame member.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
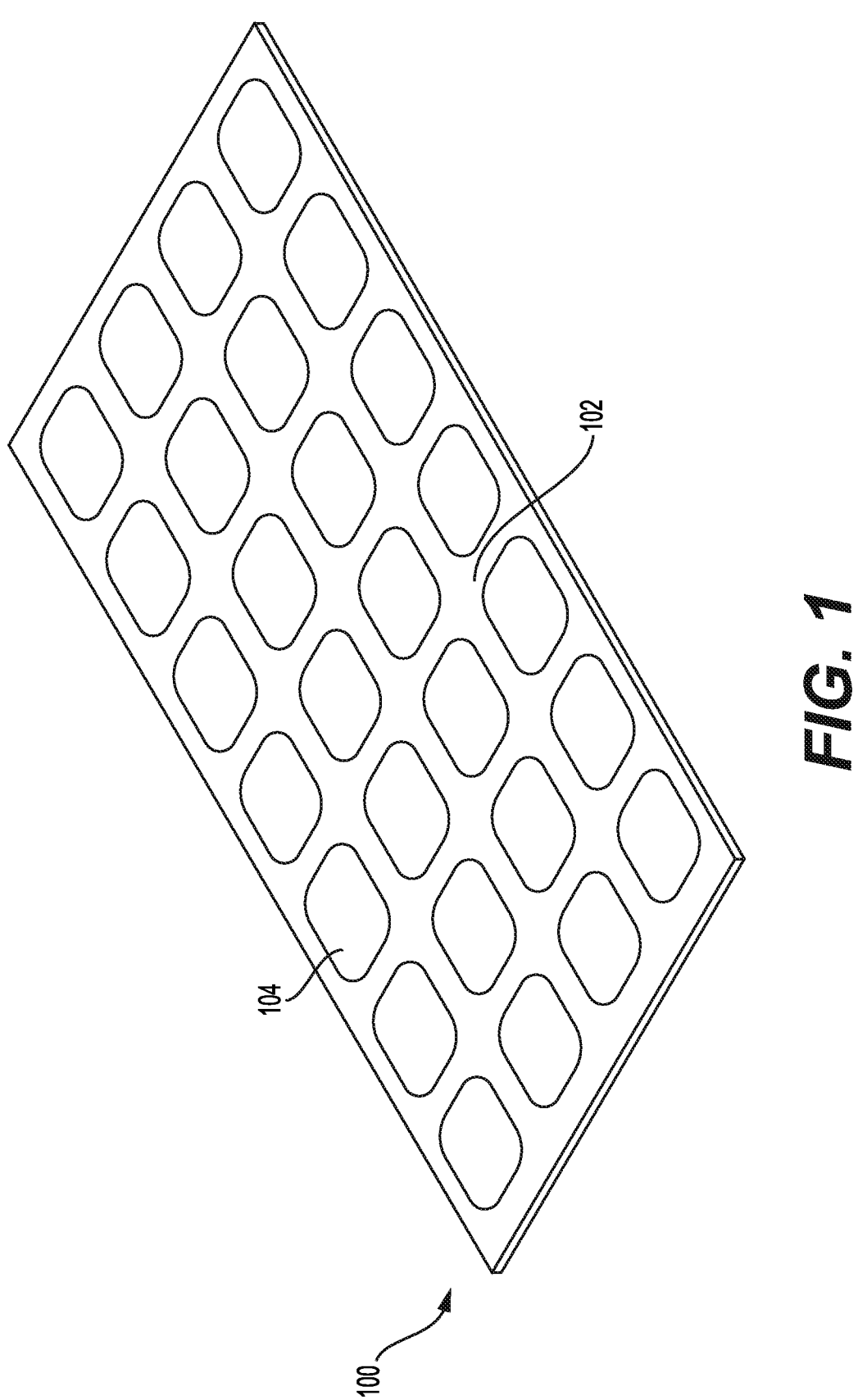
FIG. 1 is a perspective view of the metal sheet assembly for metal bonding.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments disclosed herein provide a method for metal adhesive bonding which may be used to bond skin assemblies for aircraft. Current methods employed to fabricate skin assemblies on aircraft include the usage of wrapped or curved metal sheets which are then bonded to doubler layers and stiffeners (e.g., stringers and frames). In current methods the metal sheet is first rolled into the required engineering design which often includes some form of curvature. After it is rolled the skin may then be bonded to doubler layers and stiffeners. Previous methods are disadvantageous because during bonding, which occurs after the rolling process, thick bonds and voids are often formed that are detrimental to the aircraft structure. Thick bonds and voids may lead to rejection or debonding of the assembly. Form control issues may be created in the formed parts after bonding because rolling may cause the part to be over formed or under formed meaning that the radii between the two parts do not align properly. Additionally, metal sheet assemblies are often cured in an autoclave as part of the bonding process, and autoclaves have a limited amount of space. By rolling the metal sheet assemblies into curved shapes prior to autoclaving, fewer (e.g., only one) metal sheet assemblies may fit within the autoclave for curing, making current bonding and curing processes inefficient. A method is needed which improves the efficiency of bonding a metal sheet assembly and reduces the occurrence of flaws during bonding.

Within embodiments is a method for manufacturing a metal sheet assembly. The method includes bonding together elements, such as metal sheets and frame members, prior to rolling the metal sheet assembly into a desired form. The method includes pre-fitting metallic sheets sized and cut to their final geometry, including any cutouts or holes, and existing in a flat condition with no formed curvature. In the flat condition, the metallic sheets are bonded together (including autoclaving if necessary). After the metallic sheets have been bonded together the metallic sheets are rolled into their final engineered design which may include numerous different forms of curvature. Since the metal sheets are bonded in a flat condition, the sheets are able to be stacked upon one another and placed in an autoclave so that multiple metal sheet assemblies may be cured at once, which improves the efficiency of the curing process.

FIG. 1 shows a perspective view of a metal sheet assembly 100. The metal sheet assembly 100 includes frame members 102. The frame members 102 are laid on the metal sheet 104. The metal sheet 104 may comprise sheet metal fabricated from aluminum (e.g., an aluminum alloy) and may be used to form an aircraft skin. The frame members 102 may include doubler layers, tripler layers, stiffeners, or other structural components which may increase the structural strength or integrity of the metal sheet 104. The frame members 102 are shown to be laid on top of the metal sheet 104 in a generic pattern in embodiments, but in other embodiments, could be laid to form numerous different types of patterns. The type and pattern of the frame members 102 laid to be bonded to the metal sheet 104 should not be considered limiting within the scope of this application. The metal sheet assembly 100, including metal sheet 104 and frame members 102, are in a flat configuration which allows for the metal sheet assembly 100 to lay flush on a flat surface.

Figure 2:
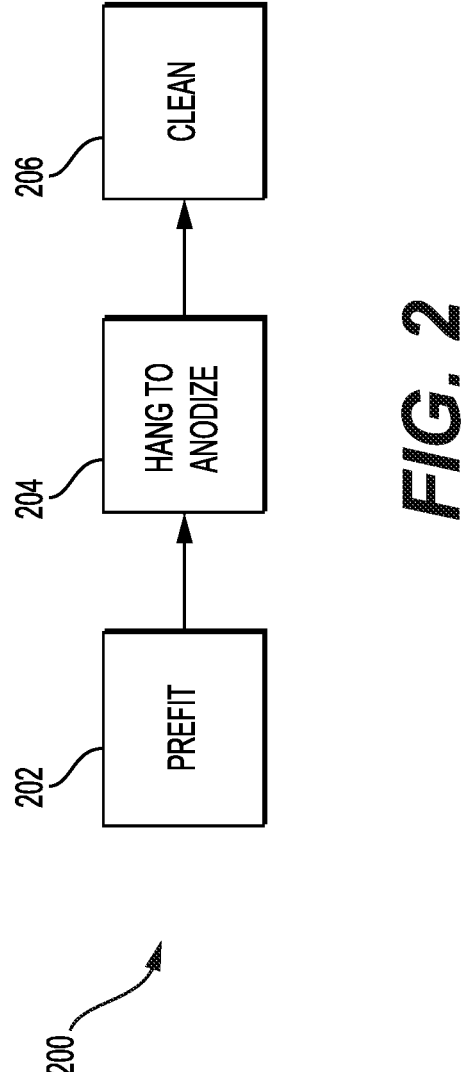
FIG. 2 is a process flow diagram for a bonding preparation method for metal bonding.

FIG. 2 shows a metal bonding preparation method 200 to prepare a metal sheet 104 for bonding. The metal bonding preparation method 200 may be used to bond the metal sheet 104 to frame members 102. The metal sheet 104 is in a flat configuration as shown in FIG. 1. A flat configuration means that the metal sheet 104 does not have purposefully formed curvature.

In a step 202, the metal sheet 104 is pre-fit. In step 202 the contours of the metal sheet 104 are examined by someone skilled in the art to ensure that the metal sheet assembly 100 is able to conform to components of the aircraft that the metal sheet may be joined thereto. The metal sheet 104 may be sized and possibly cut to its final geometric shape and include any cutouts or hole features. The metal sheet 104 and frame members 102 may be fabricated from aluminum or any other types of metal.

In a step 204 the metal sheet 104 is hung to anodize. The metal sheet 104 is configured to be suspended and hang freely downwards. The metal sheet 104 may be hung to increase the electrical continuity or substantially remove any deformations or defects that may exist in the metal sheet 104.

In a step 206 the metal sheet is cleaned. In step 206, the metal sheet 104 undergoes a cleaning process including aqueous degreasing to remove oils, waxes, or greases which may exist on surfaces of the metal sheet 104. For instance, water or a different product may be used for aqueous degreasing to substantially remove oils, waxes, or greases which may be present on the metal sheet 104. After aqueous degreasing, the metal sheet 104 may undergo alkaline cleaning to remove soils which were not removed by aqueous degreasing. After alkaline cleaning the metal sheet 104 may be deoxidized. The metal sheet 104 is deoxidized to remove environmentally occurring oxides. One deoxidation process, used in embodiments, is the phosphoric acid deoxidizing process which is an electrified process to remove an oxide layer. The cleaning step 206 may be performed by one skilled in the art to ensure an optimal phosphoric acid anodizing layer will form, which may increase the strength of an adhesion bond. Numerous other techniques to clean the metal sheet 104 may be employed and should not be considered limiting within the scope of this Application.

Figure 3A:
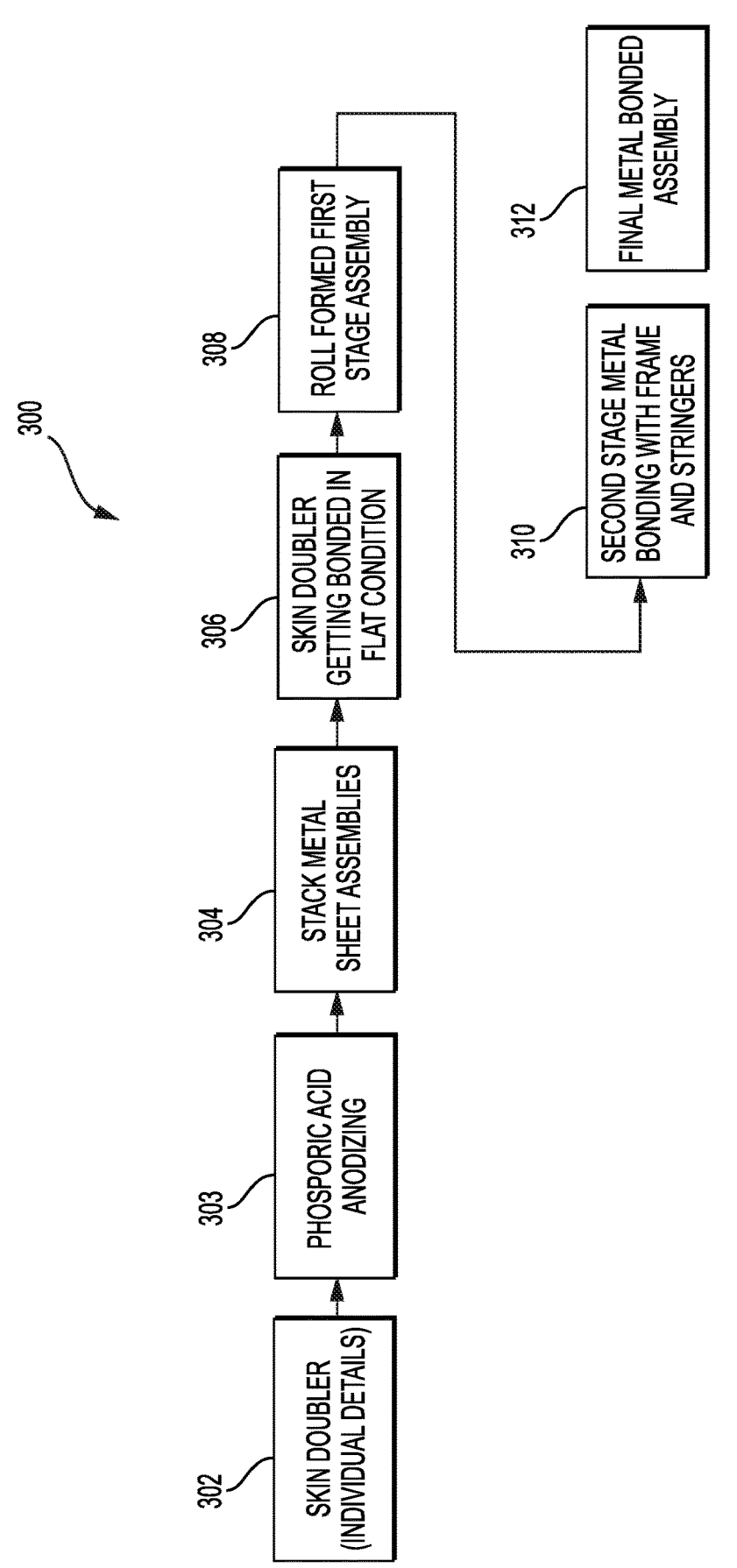
FIG. 3A is a process flow diagram for a method for metal bonding.
Figure 3B:
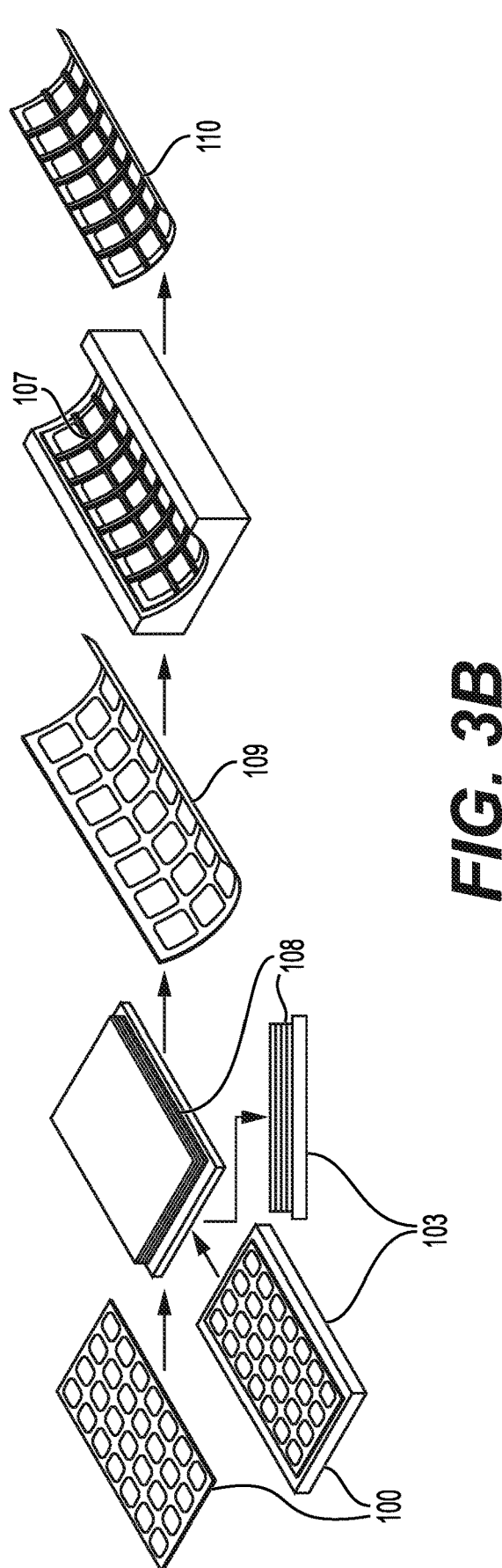
FIG. 3B shows sequential views related to the process flow of FIG. 3A.

FIG. 3A shows steps for a metal bonding method 300 for bonding the metal sheet assembly 100 and FIG. 3B shows the steps outlined in FIG. 3A in an embodiment.

In step 302 (FIG. 3A), a single metal sheet assembly 100 is provided. FIG. 3B shows the metal sheet assembly 100 is substantially flat and does not have purposefully formed curvature. In embodiments, the metal sheet assembly 100 is shown to have a rectangular geometry but could have numerous different geometric shapes while maintaining a substantially flat characteristic. The metal sheet assembly 100 is in its final geometric form which includes any holes or cutouts which may be included in the final geometry. The metal sheet assembly 100 includes the metal sheet 104 and frame members 102. The frame members 102 may comprise a doubler and are laid directly on top of the metal sheet 104. The frame members 102 shown in embodiments include a pattern having twenty-eight square patches positioned on the surface of the metal sheet 104, but other embodiments may include at least one frame member 102. In other embodiments the frame members 102 may exist in numerous different types of patterns including crisscross or weave like configurations. In step 302, the metal sheet 104 has undergone the metal bonding preparation method 200 so that the metal sheet 104 has its final geometric shape and has been cleaned; however, the frame members 102 have not yet been bonded to the metal sheet 104 in step 302.

In a step 303, (FIG. 3A) the metal sheet assembly 100 undergoes phosphoric acid anodizing for adhesive bonding. The step 303 may produce a porous anodize layer which is optimal for adhesive bonding. The phosphoric acid anodize layer is also coated with a bond primer to enhance the strength of the bond and protect the bond from corrosion.

In step 304, multiple metal sheet assemblies 100 are stacked upon one another. The plurality of metal sheet assemblies 100 (FIG. 3B) each include a metal sheet 104 and at least one frame member 102, and with the frame members 102 being laid on top of the metal sheet 104 as in step 302; however, the different metal sheet assemblies 100 may have similar or different arrangements/geometries. Each metal sheet assembly 100 including the metal sheet 104 and frame members 102 are laid flat on top of one another and are unbonded. In embodiments, approximately five to ten metal sheet assemblies 100 may be stacked on top of one another, but in other embodiments a different number of metal sheet assemblies 100 may be stacked upon one another. The metal sheet assemblies 100 are each laid substantially flat upon one another, which allows a plurality of assemblies 100 to have a height that is the same or less than a single curved metal sheet assembly 100. In some embodiments, the metal sheet assemblies 100 may be stacked upon a base or platform 103 as shown in FIG. 3B.

In a step 306 (FIG. 3A), the bond primer applied to each metal sheet assembly 100 in the sheet stack 108 is cured in a controlled setting with a controlled temperature and humidity. In embodiments shown in FIG. 3B, the bond primer and the metal sheet assembly 100 may be sealed within a bag and placed within an autoclave so that the temperature, humidity, and other environmental factors may be controlled. Alternatively, the sheet stack 108 may be bagged as a whole instead of each metal sheet assembly 100 being bagged individually. An autoclave may have a limited amount of internal space limiting the size and number of elements which may be inserted. The limited space makes it optimal for the metal sheet assemblies 100 to lack curvature prior to entering the autoclave. For instance, in an autoclave, the bond primer on each metal sheet assembly 100 in the sheet stack 108 may be cured at a setting between two hundred forty degrees Fahrenheit and two hundred sixty-five degrees Fahrenheit. The bond primer applied, in some embodiments, may be between approximately 0.00015 inches and 0.00040 inches thick after undergoing curing. The sheet stack 108 allows for multiple metal sheet assemblies 100 to be placed within an autoclave and cured at a single time. After curing, the phosphoric acid anodizing and bond primer on each metal sheet assembly 100 may be examined by one skilled in the art in order to find defects or flaws. For instance, defects or flaws in the bond primer may be light or dark colored spots, contamination in or on the bond primer, or voids or gaps in the bond. By metal bonding the metal sheet assemblies 100 in a flat position many flaws or defects in the bonding may be mitigated. By bonding each metal sheet assembly 100 in a sheet stack 108, many metal sheet assemblies 100 are able to be bonded at once and may substantially expedite the metal bonding process. The bond primer may be wiped with a solvent wipe to ensure that the bond primer is properly cured. Once the bond primer is cured and the sheet stack 108 is removed from the autoclave, the metal sheet 104 and the frame members 102 of each metal sheet assembly 100 have been substantially metal bonded together.

In a step 308, the metal sheet assembly 100 is roll formed. The sheet stack 108 (FIG. 3B) may be unstacked into a plurality of individual metal sheet assemblies 100 prior to roll forming. The roll forming step provides a desired curvature to the metal sheet assembly 100. The metal sheet assembly 100 may be roll formed in a variety of different ways and should not be considered limiting within the scope of this application. One process to roll form comprises the use of large wheels which compress the metal sheet assembly 100 and allow for the metal sheet assembly 100 to become rolled or curved. The desired curvature is applied to the metal sheet assembly 100 in step 308 to provide a curved metal sheet assembly 109.

In a step 310 (FIG. 3A), the curved metal sheet assembly 109 undergoes metal bonding a second time. The curved metal sheet assembly 109 may be bonded to frame members 102 and stiffening elements 107. The stiffening elements 107 may include stringers, doublers, or triplers. All or some of the metal bonding preparation method 200 may be performed to prepare the stiffening elements 107 for bonding to the curved metal sheet assembly 109. The stiffening elements 107 to be bonded to the curved metal sheet assembly 109 may include curvature to conform to the curvature of the curved metal sheet assembly 109. The curved metal sheet assembly 109 may be bonded within a body such as a bond fixture tool to provide support and hold the curved metal sheet assembly 109 in position during bonding.

In a step 312, the curved metal sheet assembly 109 is completed and is in its final form. The final form of the curved metal sheet assembly 109 is referred to within this Application as the final assembly 110 (FIG. 3B). In an example of step 312, the final assembly 110 is removed from the layup tool and prepared for assembly with other aircraft components (e.g., other final assemblies 110 to form a portion of an aircraft fuselage).

Figure 4:
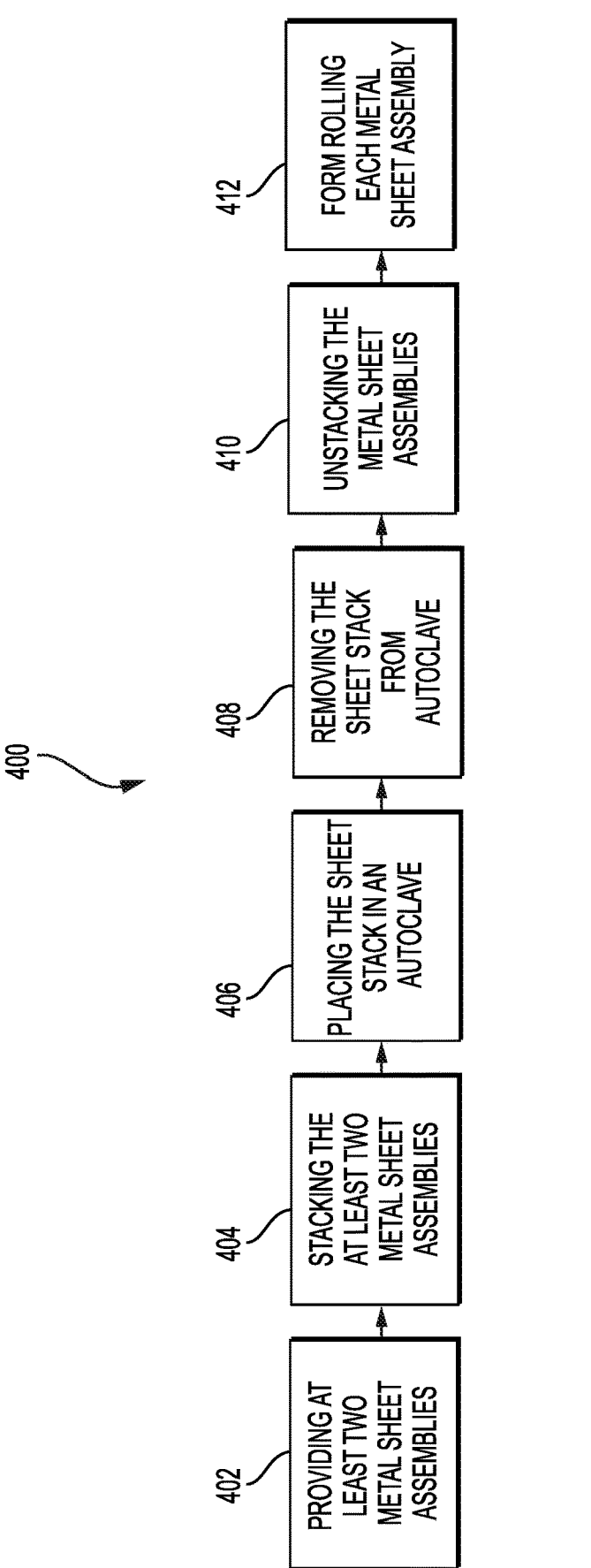
FIG. 4 is a high level process flow diagram for a method for metal bonding.

FIG. 4 shows a high level metal bonding method 400. The high level metal bonding method 400 is performed after the metal bonding preparation method 200 has been applied to the metal sheet assemblies 100. In a step 402 at least two metal sheet assemblies 100 are obtained. Each metal sheet assemblies 100 may include a frame member 102 and a metal sheet 104. Each metal sheet assembly 100 may be configured such that the frame members 102 is positioned on top of the metal sheet 104.

In a step 404, the at least two metal sheet assemblies 100 are stacked on top of one another to form the sheet stack 108. The metal sheet assemblies 100 may be the same size or different sizes and may be stacked in the sheet stack 108 such that each metal sheet assembly 100 is substantially on top of one another. In embodiments, a type of plastic film may be placed between each metal sheet assembly 100 to possibly prevent the assemblies 100 from becoming bonded to one another while stacked.

In a step 406, the sheet stack 108 is placed within an autoclave with the autoclave powered on. The autoclave internal temperature and humidity is able to be substantially controlled and allows each metal sheet assembly 100 to cure and bond. For instance, the frame members 102 and metal sheet 104 of each metal sheet assembly 100 in the sheet stack 108 will be metal bonded together within the autoclave; however, different metal sheet assemblies 100 are not being bonded to one another. Each individual metal sheet assembly 100 may be bagged in the sheet stack 108 or the sheet stack 108 may be bagged as a whole before it is placed within the autoclave. In some embodiments, a press may be used in lieu of a bag before the sheet stack 108 is placed within the autoclave. A plurality of sheet stacks 108 may be placed within the autoclave at a single time. The sheet stack 108 may be within the autoclave for a set amount of time. The amount of time the sheet stack 108 is within the autoclave, in embodiments, may be approximately between sixty minutes and one hundred eighty minutes and in other embodiments may be approximately between thirty minutes and two hundred eighty minutes. The temperature of the autoclave may vary based upon the type of adhesive used and in embodiments may be approximately between two hundred forty degrees Fahrenheit and three hundred sixty degrees Fahrenheit. In other embodiments the temperature of the autoclave may be approximately between two hundred degrees Fahrenheit and four hundred degrees Fahrenheit. The length of time the sheet stack 108 is in the autoclave and the temperature of the autoclave may depend on the size of the sheet stack 108 and the type of adhesive being used.

In a step 408, after the sheet stack 108 has been autoclaved for a length of time to allow for each metal sheet assembly 100 to cure, the autoclave may be powered off and the sheet stack 108 may be removed from the autoclave.

In a step 410, the sheet stack 108 may be disassembled and the metal sheet assemblies 100 unstacked from one another. Any bags that may have been placed over the metal sheet assemblies 100 may be removed. The sheet stack 108 may be unstacked using a peel ply tool.

In a step 412, each bonded metal sheet assembly 100 may be roll formed. The metal sheet assembly 100 may be roll formed using a press in which the metal sheet assembly 100 is compressed and formed to have a desired curvature or shape. The metal sheet assembly 100 may then be in its final geometry.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A method for metal bonding, the method comprising:
   providing at least two flat metal sheet assemblies, wherein each of the flat metal sheet assemblies comprises a metal sheet and a plurality of frame members laid on top of the metal sheet;
   preparing the metal sheet and the frame members for bonding, comprising:
      hanging the flat metal sheet assembly such that the flat metal sheet assembly hangs freely from a structure; and cleaning the flat metal sheet assembly by applying a phosphoric acid deoxidizer to the flat metal sheet assembly while hanging;
   stacking the metal sheet assemblies to create a sheet stack;
   placing the sheet stack into an autoclave for bonding each metal sheet with its respective frame members;
   removing the sheet stack from the autoclave;
   unstacking the flat metal sheet assemblies from the metal sheet stack; and
   form rolling the flat metal sheet assemblies individually to provide at least two curved metal sheet assemblies.

2. The method of claim 1 wherein the frame members include doublers, triplers, stringers, and stiffeners.

3. The method of claim 1 comprising forming an aircraft skin with the curved metal sheet assemblies.

4. The method of claim 1 comprising laying the frame members on a surface of the metal sheet to form one of the flat metal sheet assemblies.

5. The method of claim 1 wherein form rolling comprises providing a curvature to each of the flat metal sheet assemblies using a metal sheet rolling machine.

6. The method of claim 1 comprising pre-fitting the flat metal sheet assemblies such that the flat metal sheet assemblies are cut to their final geometry.

7. A method for bonding a metal sheet assembly, the method comprising:
   providing a first metal sheet and a first frame member;
   performing a bonding preparation to the first metal sheet and the first frame member, wherein the bonding preparation comprises a pre-fitting step, a hanging step, and a cleaning step;
   laying the first frame member flat on the first metal sheet;
   providing a second metal sheet and a second frame member;
   performing the bonding preparation to the second metal sheet and the second frame member;
   laying the second frame member flat on the second metal sheet;
   placing the second metal sheet and the second frame member on top of the first metal sheet and the first frame member to form a stack;
   placing the stack inside an autoclave;
   autoclaving the stack, thereby bonding the first frame member to the first metal sheet to form a first sheet assembly and bonding the second frame member to the second metal sheet to form a second sheet assembly, wherein the first sheet assembly and the second sheet assembly are each substantially flat;
   removing the stack from the autoclave;
   unstacking the first sheet assembly and the second sheet assembly;
   roll forming the first sheet assembly and roll forming the second sheet assembly.

8. The method of claim 7 wherein roll forming the first sheet assembly provides a first curved metal sheet assembly and roll forming the second sheet assembly provides a second curved metal sheet assembly.

9. The method of claim 7 wherein the pre-fitting step comprises cutting the first metal sheet to its respective final geometry and cutting the second metal sheet to its respective final geometry.

10. A method for bonding metal sheet assemblies, the method comprising:
   providing a plurality of metal sheets and a plurality of frame members;
   pre-fitting the metal sheets;
   hanging the metal sheets;

cleaning the metal sheets;

placing a first frame member on a first metal sheet and placing a second frame member on a second metal sheet;

sealing the first metal sheet in a bag and sealing the second metal sheet in a bag;

stacking the second metal sheet onto the first metal sheet to form a sheet stack;

placing the sheet stack into an autoclave;

autoclaving the sheet stack thereby forming and curing a first bond between the first metal sheet and the first frame member and forming and curing a second bond between the second metal sheet and the second frame member;

removing the sheet stack from the autoclave;

unsealing the first metal sheet and unsealing the second metal sheet;

unstacking the second metal sheet from the first metal sheet; and roll forming each of the first metal sheet and the second metal sheet thereby forming a first curved metal sheet and a second curved metal sheet;

bonding the first curved metal sheet to an additional frame member, and;

bonding the second curved metal sheet to a second additional frame member.

11. The method of claim 10 comprising:

bonding a first additional stiffening element to the first curved metal sheet to form a first aircraft skin section; and bonding a second additional stiffening element to the second curved metal sheet to form a second aircraft skin section.

12. The method of claim 11 comprising mechanically coupling together the first aircraft skin section with the second aircraft skin section to form a portion of an aircraft fuselage.

13. The method of claim 10 wherein pre-fitting the metal sheets comprises cutting holes into each of the metal sheets.

\* \* \* \* \*